Sept. 15, 1925.

L. Q. BULLA

HOG TROUGH

Filed June 8, 1925

1,553,746

Inventor,
L. Q. Bulla,
By
Atty.

Patented Sept. 15, 1925.

1,553,746

UNITED STATES PATENT OFFICE.

LEON Q. BULLA, OF ANSLEY, NEBRASKA.

HOG TROUGH.

Application filed June 8, 1925. Serial No. 35,688.

*To all whom it may concern:*

Be it known that I, LEON Q. BULLA, a citizen of the United States, residing at Ansley, in the county of Custer and State of Nebraska, have invented new and useful Improvements in Hog Troughs, of which the following is a specification.

The invention relates to improvements in hog troughs.

The object of the present invention is to improve the construction of hog troughs and to provide a simple, practical and comparatively inexpensive hog trough of great strength and durability which will be portable and adapted to be readily transferred from one place or farm to another and which will be easy to clean and maintain in a proper condition.

A further object of the invention is to provide a hog trough of this character adapted for feeding hogs or pigs of any size and capable to ready adjustment to suit the size of the animals to be fed and capable of effectually preventing such animals from either standing or lying in it.

It is also an object of the invention to provide a hog trough which can be covered when not in use and which may be employed for soaking feed thereby saving the handling of grain and water a second time.

Another object of the invention is to provide a hog trough which will be cleaner and cheaper than the ordinary feeding floor, and which may be arranged to afford ready access to the interior when required.

With these and other objects in view, the invention consists in the construction and novel combination and arrangement of parts hereinafter fully described illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

In the accompanying drawing in which is illustrated the preferred embodiment of the invention, 1 designates a feeding trough designed to be constructed of sheet metal or other suitable material and preferably provided at its upper edge with a bead 2 and having transverse bottom bars 3 projecting laterally beyond the bottom of the trough and forming a relatively wide base to prevent the hog trough from being upset. The base formed by the extended bars 3 may be of any desired size and the bars may be staked or otherwise secured to the ground if desired.

Figure 1:
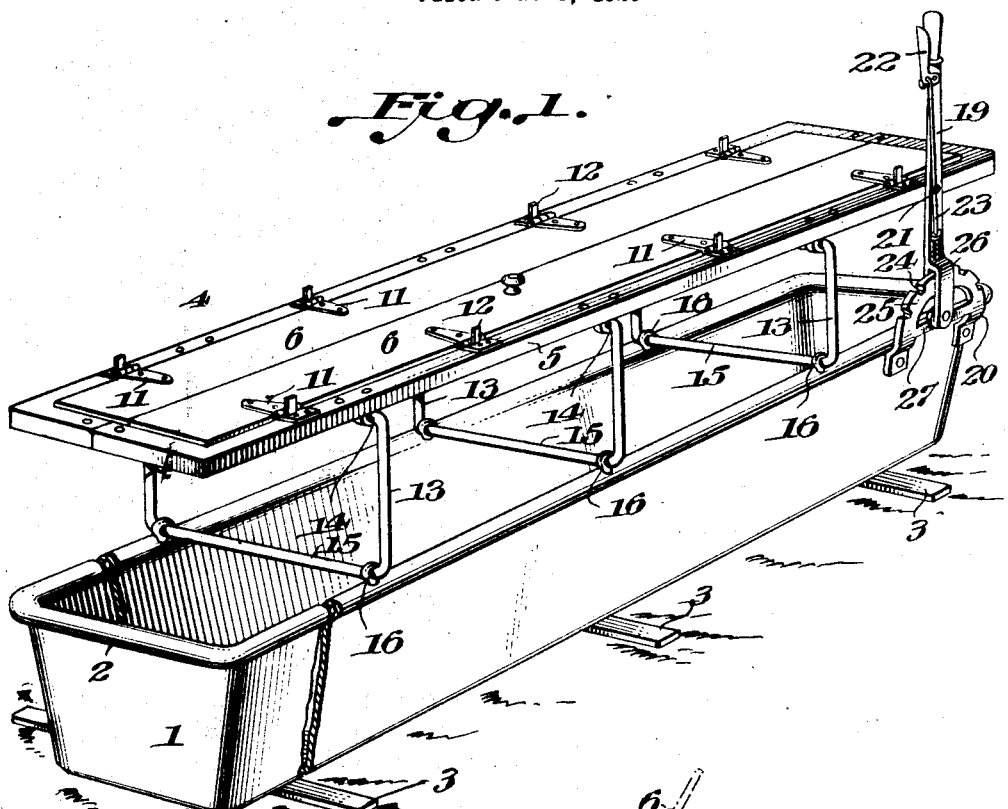
Figure 1 is a perspective view of a hog trough constructed in accordance with this invention, the cover being elevated to the limit of its upward movement to facilitate illustration of the invention.
Figure 2:
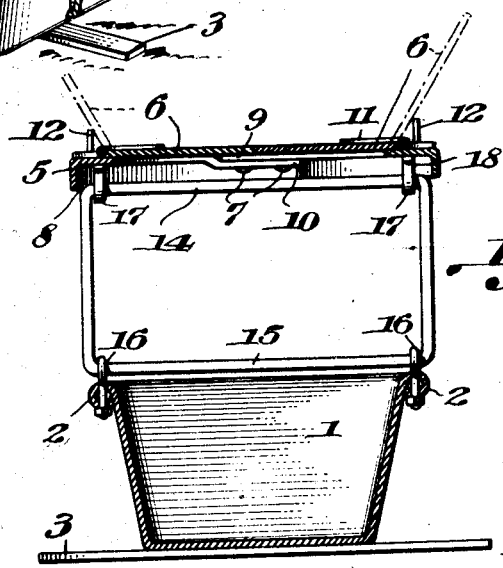
Figure 2 is a transverse sectional view of the same.

The hog trough is equipped with an adjustable cover 4 adapted to be raised and lowered in a horizontal position to arrange it the desired distance above the trough 1 and also to lower it upon the trough to cover the same to protect the contents of the trough and also to exclude animals therefrom between feeding times when desired. The adjustable cover comprises an oblong frame 5 and a hinged cover section 6 which are mounted upon the frame 5 and which may be of different widths to adapt the cover to feeding troughs of different sizes. The frame 5 is composed of two sections secured together at the ends of the cover by rivets 7 or other suitable fastening devices and the said frame is preferably constructed of flanged or angle iron as shown but any other suitable material may, of course, be employed in the construction of the frame. The flange 8 of the frame forms a skirting and is adapted to extend around the upper edge or bead of the feeding trough 1 when the cover is lowered to the limit of its downward movement and the sections of the frame 5 have overlapped portions 9 and 10 as clearly shown in Fig. 2 of the drawing, the overlapped portion 10 being preferably deflected downwardly as shown to provide a space for the overlapping portion 9. By this construction the oblong frame 9 is adjustable to suit the width of the feeding trough and after the frame is assembled and the section secured together to provide a frame of the proper width, cover sections 6 of the proper width are secured to the frame 5 at their outer edges by hinges 11 which permit the cover sections to swing upwardly and outwardly as illustrated in dotted lines in Fig. 2 of the drawing and the hinges may be provided with projecting lugs 12 to form stops for limiting the outward swing of the cover sections. This will provide a hopper-like upper portion for enabling the feed or the ingredients of feed to be readily poured in the feeding trough 1. The cover section 6 when closed rests upon the upper faces of the sections of the frame 5 which are in flush relation when the sections of the said frame are secured together.

The cover is connected with the feeding trough by horizontal elements 13 preferably consisting of rectangular links composed of upper and lower transverse pintle portions 14 and 15 and connecting side portions which are adapted to swing in the raising and lowering of the cover 4. The lower pintle portion 15 is arranged in lower eyes 16 preferably consisting of eye bolts which pierce the bead at the upper edge of the feeding trough. The upper pintle portion 14 is arranged in upper eyes 17 which are secured by rivets 18 or other suitable fastening devices to the lower faces of the sections of the oblong frame 5 within the marginal depending flanges 8 thereof. The hog trough is shown equipped with three of the swinging hinge elements 13 but any desired number may, of course, be employed to suit the length of the trough and the form of the hinge elements 13 may, of course, be varied. The cover is raised and lowered by means of an operating lever 19 pivoted at the lower end to a bracket 20 of the feeding trough and at a point intermediate of its ends at 21 to the frame 5. The operating lever and the links of the hinge members are arranged in parallelism and the operating lever extends above the cover and is provided at its upper end with a suitable grip or handle and is equipped thereat with a latch lever 22 connected with a spring actuated locking rod 23 guided in the lower portion of the operating lever and arranged to engage notches 24 of a segment 25 of the bracket 20. The bracket 20 is constructed of suitable metal and is riveted or otherwise secured to the exterior of one side of the feeding trough at one end thereof and its segmental portion projects above the trough and is bent outwardly to clear the cover. The lower portion 26 of the lever is forked or bifurcated to straddle the bracket which is provided with a transverse portion 27 to which the operating lever is pivoted. The operating lever is adapted to be readily grasped by the handle and the latch lever is simultaneously operated with the movement of the lever to swing the same for raising or lowering the cover.

The cover is adapted to be arranged either upon the feeding trough 1 to close the same or at any desired distance above the feeding trough within its range of movement to adapt a hog trough for feeding animals of different sizes and to prevent the animals from entering the feeding trough and standing therein or lying down within the same. In this manner the animals are prevented from soiling or spoiling the feed and the feed may be mixed prior to feeding time in the feeding trough and the latter will thereby avoid handling the materials more than once.

The hog trough may be made of any desired size and it can be constructed cheaper than an ordinary feeding floor and may be maintained cleaner than the latter. Also it is portable and may be transferred by a tenant from one place to another.

What is claimed is:

1. A hog trough comprising a feeding trough, a cover and plurality of links substantially rectangular shaped pivotally connected with the trough and with the cover for enabling the latter to be raised and lowered in a horizontal position and means for raising and lowering the cover and for securing the same in its adjustment.

2. A hog trough comprising a feeding trough, a cover and plurality of hinged elements extending transversely across the trough and connecting the cover with the trough and arranged to permit the cover to be raised and lowered in a horizontal position, said cover being provided with hinged cover sections arranged to swing laterally in opening and closing.

3. A hog trough comprising a feeding trough, a cover, and plurality of hinged elements extending transversely across the trough and connecting the cover with the trough and arranged to permit the cover to be raised and lowered in a horizontal position, said cover comprising an oblong frame and cover sections arranged upon the said frame and closing the space within the same and hinged at their outer edges to the frame to open and close laterally.

4. A hog trough comprising a feeding trough, a cover, and plurality of hinged elements extending transversely across the trough and connecting the cover with the trough and arranged to permit the cover to be raised and lowered in a horizontal position, said cover comprising an oblong frame and cover sections arranged upon the said frame and closing the space within the same and hinged at their outer edges to the frame to open and close laterally, and a stop for limiting the outward swing of the cover sections for providing a hopper-like structure above the feeding trough.

5. A hog trough comprising a feeding trough a cover and plurality of hinged elements connecting the cover with the trough and arranged to permit the cover to be raised and lowered in a horizontal position, said cover comprising an oblong frame and cover sections arranged upon the said frame and closing the space within the same and hinged at their outer edges to the frame to open and close laterally, said cover comprising a substantially oblong frame composed of laterally adjustable overlapped sections provided with a marginal flange and rigidly secured together at their overlapped portions and cover sections arranged upon and carried by the sections of the frame.

6. A hog trough comprising a feeding trough, a cover, eyes carried by the feeding trough and the cover, substantially rectangular hinged elements across the trough and the cover and having pintle portions arranged in the said eyes whereby the cover is adapted to be raised and lowered in a horizontal position.

In testimony whereof I have hereunto set my hand.

LEON Q. BULLA.